Patented May 30, 1939

2,160,195

UNITED STATES PATENT OFFICE 2,160,195

PROCESS AND FLUX FOR SOLDER BONDING ON COATED METAL SURFACES

Norman J. Beno, Chicago, Ill., assignor to Continental Can Company, Inc., New York, N. Y., a corporation of New York No Drawing. Application February 18, 1935, Serial No. 7,145

3 Claims. (Cl. 113—112)

In many industries it is essential to bond or join metal surfaces. This bonding is normally accomplished by heating a bonding material in the presence of a fluxing agent. The bonding material includes the alloys known as solders. The flux is employed for preparing the metal surfaces and to protect them and the solder during the uniting.

Certain difficulties are encountered in bonding protected metal surfaces such as zinc plate, comprising a base of steel having a thin electrodeposited coating of zinc thereon. The zinc must be removed for a proper bonding by the solder upon the surface of the base plate itself. Heretofore it has been customary to remove the plating by a separate mechanical or chemical operation and thereafter to prepare the treated plate for the bonding.

According to the present invention, it is proposed to employ a treating material which incorporates in itself means for removing the plating and also for establishing a flux during the bonding operation proper.

The invention is applicable to metal surfaces in general which have protective coatings thereon, and comprises the utilization as a flux during the bonding operation of a composition including a metal which is electronegative with respect to the metal of the plating, and thereby exchanges with the same to accomplish the removal of the coating metal. In the preferred form, the product resulting from the exchange is a metal salt which is operative as a flux during the bonding operation.

As a specific example of practice of this invention for the purpose of solder-bonding sheets of steel electroplated with zinc, which is particularly advantageous in the formation of metal containers from such sheets, the following composition is employed:

| | Pounds | Ounces |
|---|---|---|
| Stannous chloride crystals ($SnCl_2.2H_2O$) | 9 | 6.2 |
| Zinc chloride ($ZnCl_2$) | 2 | 14.6 |
| Ammonium chloride ($NH_4Cl$) | 0 | 1.4 |
| Water | 3 | 11.4 |

A part of the water is heated, the stannous chloride introduced, and the heat maintained until the salt goes into solution. The other ingredients are dissolved in the remaining water in the cold. The two solutions are then mixed. The product is about 1 gallon of a flux of about 70 degrees Bé.

At this concentration, the flux should be kept at a temperature of about 80 degrees F. or above to prevent crystallization. Any salt which crystallizes is easily re-dissolved by warming the flux. It is possible to dilute the highly concentrated and strong flux thus produced with water or alcohol to a desired extent.

The flux solution is milky in appearance and this milkiness becomes more pronounced as the flux is diluted. If desired, 2 to 3 percent of concentrated hydrochloric acid may be added, preferably to the water when the salts are dissolved, and this will in most cases prevent the formation of the milkiness or any milky precipitate. The existence of the said precipitate, however, does not appear to interfere with the proper operation of the flux.

In operation, the flux is applied to the coated metal and an exchange then occurs between the tin in the flux and the zinc of the coating, resulting in the production of zinc chloride in the flux liquid and a deposit of tin upon the plate. The action is very rapid. The application of the solder alloy and heating appears to cause a blending of the solder alloy with the deposited tin, so that a very firm union results, the metal and solder being protected by the flux.

A similar action is attainable with the stannous chloride itself, but this does not appear so satisfactory as the flux composition set out above.

This composition can also be employed with metal surfaces of iron, steel and the like base metals customarily employed when coated with cadmium, tin, aluminum and similar metals particularly when deposited electrolytically, in conjunction with the provision of a salt of a metal which is electronegative with respect to the metal of the coating, such as stannous chloride, copper chloride, etc.

Having thus described the invention, what I claim as new and desire to secure by Letters Patent, is:

1. A surface treatment and fluxing composition for solder bonding on steel surfaces having protective coatings of zinc and like metals thereon, comprising approximately 9½ pounds of stannous chloride, approximately 3 pounds of zinc chloride and approximately 3 percent of ammonium chloride dissolved in water to provide an aqueous solution having a density of approximately 70 degrees Bé. at room temperature.

2. A surface treatment and fluxing composition for solder bonding on steel surfaces having protective coatings of zinc and like metals thereon, comprising approximately 9½ pounds of stannous chloride, approximately 3 pounds of zinc chloride and approximately 3 percent of ammonium chloride dissolved in water to provide an aqueous solution having a density of approximately 70 degrees Bé. at room temperature, and also containing approximately 2 to 3 percent of concentrated hydrochloric acid.

3. The method of establishing a solder bond at steel surfaces having protective coatings of zinc and like metal thereon, which comprises locally applying a flux comprising an aqueous solution having a density of approximately 70 degrees Bé. at room temperature and containing approximately 9½ pounds of stannous chloride, approximately 3 pounds of zinc chloride, and approximately 3 percent of ammonium chloride, the metal being heated to about 80 degrees F., whereby the zinc or like metal of the coating is removed and converted to the chloride thereof and the tin of the stannous chloride is deposited in metallic form upon the steel, and thereafter heating in the presence of solder to cause a melting of the solder in contact with the treated metal surface and precipitated tin and in the presence of the residual chlorides as a flux for the soldering operation.

NORMAN J. BENO.